United States Patent
Rychlik (10) Patent No.: US 12,496,966 B2
(45) Date of Patent: Dec. 16, 2025

(54) VEHICLE PASSENGER INTENT DETERMINATION FOR SEATBELTS AND DOORS

(71) Applicant: Aptiv Technologies (2) S.à r.l., Luxembourg (LU)

(72) Inventor: Mariusz Rychlik, Wegrzce Wielkie (PL)

(73) Assignee: Aptiv Technologies AG, Schaffhausen (CH)

( * ) Notice: Subject to any disclaimer, the term of this patent is extended or adjusted under 35 U.S.C. 154(b) by 199 days.

(21) Appl. No.: 18/473,208

(22) Filed: Sep. 23, 2023

(65) Prior Publication Data

US 2024/0101030 A1 Mar. 28, 2024

(30) Foreign Application Priority Data

Sep. 23, 2022 (EP) .................................. 22197565

(51) Int. Cl.
*B60Q 9/00* (2006.01)
*B60R 22/48* (2006.01)
(Continued)

(52) U.S. Cl.
CPC ............ *B60Q 9/00* (2013.01); *B60R 22/48* (2013.01); *G06T 7/73* (2017.01); *G06V 20/593* (2022.01);
(Continued)

(58) Field of Classification Search
CPC ....... B60Q 9/00; B60R 22/48; B60R 22/4808; B60R 22/4816; B60R 22/4866;
(Continued)

(56) References Cited

U.S. PATENT DOCUMENTS

| 10,953,850 B1 * | 3/2021 | Pertsel | B60R 21/01538 |
| 2014/0309886 A1 * | 10/2014 | Ricci | H04L 67/55 701/41 |

(Continued)

FOREIGN PATENT DOCUMENTS

JP 2019200548 A 11/2019

OTHER PUBLICATIONS

Nori et al JP 2019-200548 English translation (Year: 2019).*
Extended European Search Report for EP Application No. 22197565.9 dated Mar. 15, 2023, 8 pages.

*Primary Examiner* — Erick R Solis
(74) *Attorney, Agent, or Firm* — Miller Johnson (57) ABSTRACT

A perception-based monitoring method for determining a passenger's intention to unbuckle a seatbelt and/or to open a door, including: receiving input data including an image of an interior of the vehicle captured by a camera mounted in the vehicle; assigning based on the image, a set of predefined body keypoint positions (BKP) associated with a detected passenger; computing a manipulation score, indicative of an intention of the passenger to unbuckle a seatbelt and/or to open a door, based on the assigned set of predefined BKP in relation with a seatbelt buckle and/or a door handle; determining the passenger's intention in case the manipulation score exceeds a predefined threshold; and if a passenger's intention is determined, adjusting a control function of a safety system of the vehicle; and/or notifying an occupant of the vehicle of the passenger's intention.

18 Claims, 3 Drawing Sheets

(51) Int. Cl.
  *G06T 7/73* (2017.01)
  *G06V 20/59* (2022.01)
  *G06V 40/10* (2022.01)
  *G06V 40/20* (2022.01)
  *B60W 50/00* (2006.01)

(52) U.S. Cl.
  CPC .............. *G06V 40/10* (2022.01); *G06V 40/11* (2022.01); *G06V 40/20* (2022.01); *G06V 40/28* (2022.01); *B60R 2022/4808* (2013.01); *B60R 2022/4866* (2013.01); *B60W 50/0098* (2013.01); *G06T 2207/30196* (2013.01); *G06T 2207/30268* (2013.01)

(58) Field of Classification Search
  CPC ...... B60W 50/0098; G06T 7/73; G06V 20/59; G06V 20/593; G06V 20/597; G06V 40/107; G06V 40/11; G06V 40/20; G06V 40/28

USPC .......................................................... 701/45
See application file for complete search history.

(56) References Cited

U.S. PATENT DOCUMENTS

| | | | |
|---|---|---|---|
| 2015/0283974 | A1 | 10/2015 | Schlittenbauer et al. |
| 2016/0046261 | A1* | 2/2016 | Gulash .................... G06T 17/20 701/45 |
| 2018/0222346 | A1* | 8/2018 | Reckziegel .......... B60N 2/0026 |
| 2018/0326944 | A1* | 11/2018 | Cech ...................... B60Q 3/242 |
| 2019/0126815 | A1 | 5/2019 | Morel et al. |
| 2020/0231109 | A1* | 7/2020 | Baltaxe .................... G06N 3/08 |
| 2021/0206344 | A1* | 7/2021 | George ............. B60R 21/01544 |
| 2021/0394710 | A1* | 12/2021 | Hu ........................ B60W 40/09 |
| 2022/0114817 | A1* | 4/2022 | Gronau .................. G06V 40/10 |
| 2022/0250570 | A1* | 8/2022 | Yilmaz ................... B60R 22/48 |
| 2022/0324458 | A1* | 10/2022 | Neubecker ............. B60K 35/65 |
| 2024/0278747 | A1* | 8/2024 | George ............. B60R 21/01512 |
| 2024/0369369 | A1* | 11/2024 | Yew ..................... G06V 10/809 |

* cited by examiner

VEHICLE PASSENGER INTENT DETERMINATION FOR SEATBELTS AND DOORS

CROSS-REFERENCE TO RELATED APPLICATIONS

This application claims priority to EP App. No. 22197565 filed Sep. 23, 2022, the entire disclosure of which is incorporated by reference.

FIELD

The present disclosure relates to the field of automotive, more specifically, to a perception-based monitoring method for determining a passenger's intention to unbuckle a seatbelt and/or open a door.

BACKGROUND

Current monitoring methods and corresponding systems focus mostly on the detection of fastened/unfastened seatbelts or closed/opened doors. Such system is based on wired connection to the seatbelt buckles or door handles or any other switch in the doors. The retrieved information from these connections and switches is binary: seatbelt is buckled or unbuckled, door is opened or closed.

SUMMARY

Although the background "binary" solution is relatively easy to build, it does not cover all needs, especially in terms of security to prevent some dangerous situations. Indeed, in many cases, it could be already too late to react when a seatbelt is already unbuckled as some children, especially young ones, might not be able to buckle it again by themselves. When such a situation occurs, the driver is distracted and has to stop the vehicle to buckle the child's seatbelt again. Same happens with doors, although rear doors might be protected from unauthorized opening, it can however be unintentionally disabled or forgotten resulting in unexpected rear door's opening.

Since these "binary" systems and methods do not overcome the above-mentioned issues, there is a need for improving existing systems and methods in order to at least partially overcome the aforementioned drawbacks. In particular, it is suitable to propose a monitoring method that anticipates a passenger's intention to unbuckle a seatbelt and/or open a door and tries to prevent it.

To address such a concern, the present disclosure according to a first aspect suggests a perception-based monitoring method for determining a passenger's intention to unbuckle a seatbelt and/or to open a door, including the steps of: receiving input data including at least one set of data points of an interior of the vehicle captured by a perception-based system mounted in the vehicle; assigning based on the at least one set of data points, a set of predefined body keypoint positions (BKP) associated with at least one passenger detected by the perception-based system; computing a manipulation score, indicative of an intention of the at least one passenger to unbuckle a seatbelt and/or to open a door, based on the assigned set of predefined BKP in relation with a seatbelt buckle and/or a door handle; determining a passenger's intention to unbuckle a seatbelt and/or to open a or in case the manipulation score exceeds a predefined threshold; and if a passenger's intention to unbuckle a seatbelt and/or to open a door is determined, adjusting at least one control function of a safety system of the vehicle; and/or notifying at least one occupant of the vehicle of the passenger's intention.

Based on the calculation of a manipulation score, this monitoring method determines a passenger's intention to unbuckle a seatbelt and/or to open a door so as to be able to anticipate the actual manipulation and to react to prevent it. This can be done by adjusting a control function of a safety system of the vehicle, such as an emergency braking system, an obstacle avoidance system or a lane change system, in order to reduce the risks in case the manipulation cannot be prevented. determination of the passenger's intention allows the safety system to react sooner but more gently to reduce strength of reactions and thus reduce risk of reaction's consequences when the manipulation actually occurs. By notifying one occupant of the vehicle before the manipulation occurs, either the driver or the passenger, it gives an opportunity to prevent the actual manipulation such as a reaction of the river convincing the passenger to stop or stopping the car in a safe place without rush.

In various implementations, the notifying step includes the following sub-steps: detecting predefined situations requiring driver's attention; if such predefined situation is detected, skipping or delaying driver's notification at least until such predefined situation is no longer detected; and notifying the passenger, for whom an intention to unbuckle a seatbelt and/or to open a door has been determined, otherwise notifying the driver of the vehicle. The passenger's notification is preferably a silent notification.

To avoid accidently distracting the driver with a notification when predefined situations occur such as a safety system being active, a maneuver being detected (e.g. overtaking another vehicle, parking), or specific driving conditions being faced (e.g. intersection, turn, foggy, snowy or rainy weather conditions), the method will either delay the notification to the driver until the end of the predefined situation or simply skip the notification. Instead, the passenger is notified, preferably by a silent notification, to prevent distracting the driver, such as vibrating the passenger's seat, switching on or off an entertainment device of the passenger or lighting up the passenger, so the passenger gets distracted from his/her intention to unbuckle the seatbelt or open the door.

In various implementations, the set of predefined BKP includes at least wrist and hand positions of at least one passenger and the manipulation score computing step includes one or more of the following calculation steps: calculating the distance between the wrist and/or hand positions with a seatbelt buckle or a door handle in 2D space of the at least one set of data points; and/or determining occlusion of a seatbelt buckle or a door handle by the wrist and/or hand positions in 2D space of the at least one set of data points.

To improve determination of a passenger's intention, it is made use of the hand and wrist positions with respect to the seatbelt buckles and door handles, and more specifically the manipulation score is increased with the proximity of the hand/wrist to the buckle or handle.

Advantageously, the assigning step further includes: determining from the at least one set of data points, an eye gaze direction (EGD) of at least one passenger; and the manipulation score computing step further includes the following calculation step: calculating the intersection of the EGD with a seatbelt buckle or a door handle in 2D or 3D space of the at least one set of data points. More preferably, a dedicated calibration file containing the position of the back door handles is stored and the manipulation score computing step further includes a calculation step taking into account the dedicated calibration file and a pose estimation assignment of the passenger combined with the EGD.

To further improve the determination of a passenger's intention, it is made use of the EGD to compute the manipulation score. If BKP are moving towards and get closer to (or even touch) a seatbelt buckle or a door handle and simultaneously the EGD is directed towards the seatbelt buckle or door handle, then the risk of manipulation is high and therefore the manipulation score is increased. Further, EGD is used to compensate any difficulty to locate buckles or door handles due to low-resolution images and/or low-light conditions, or being covered by something (a part of clothes, body part etc.) or even hidden by car parts— especially rear door handles might be not visible due to front seats.

Advantageously, the assigned predefined BKP and assigned EGD are each given with a confidence value based on detection correctness factor associated with the perception-based system and the calculation steps are weighted with the given confidence values.

To further improve the determination of a passenger's intention, it is made use of confidence values, which may be provided by specific feature detectors such as eye gaze detector or body keypoint detector. Such confidence values are related to the certainty in the extraction of BKP and EGD by the specific featured detectors from the set of data points. These confidence values are used to mitigate the risk of false positive notifications.

In various implementations, the input data received further includes one or more amongst: status data of one or more safety systems of the vehicle in operation to determine situations requiring driver's attention, and/or status data of passenger's seatbelt buckles and door handles to prevent false positive notification, and/or vehicle instrumentation data of passenger's window opening or closing to prevent false positive notification, and/or calibration data on relative positions within the vehicle between the perception-based system and each passenger's seat belt buckles and door handles as parameters for computing the manipulation score. The data related to safety systems includes status data, preferably in the form of a list of the active safety systems being currently used, such as braking assist system, traction control system, electronic stability control system or advanced driver-assistance system. Whenever a least one of this active safety is operational, the driver is not notified to prevent distraction but the passenger instead is notified. The data related to the passenger's seatbelt buckles and door handles includes the status if buckles are fastened/unfastened and if the door handles are activated/deactivated but also if doors are opened/closed and/or locked/unlocked. Such information helps to prevent false positive notification by taking into account if the buckle is unfastened and the passenger is fastening or if the passenger tries to manipulate a rear door handle that is already locked with the child security. The data related to window's opening or closing actions is used to prevent false positive notification by decreasing the manipulation if the passenger manipulates the window rather than the door handle. The data related to the relative positions between the perception-based system, buckles and handles are preferably stored in a configuration file and used to estimate distances as well as estimating the positions of non-visible elements on the received set of data points.

In various implementations, the method further includes the steps of: determining false positives of a passenger's intention; amending the manipulation score based on the determined false positives weighted with a confidence coefficient. Preferably, the false positive indicators are determined with a confidence coefficient and the manipulation score is amended based on the determined false positives weighted with their confidence coefficient.

In order to prevent false positive notifications which lead to lower user experience through unwanted actions on safety systems and unnecessary driver's distractions, predefined false positive indicators such as drowsiness of a passenger, passenger's window opening/closing or non-usage of a seatbelt due to ISOFIX seat installed on the passenger seat, are used to decrease or even zero the manipulation score. False positive indicators are preferably received with a confidence coefficient expressing the degree of certainty of these indicators. If the confidence coefficient is 1, it means that the false positive indicator is 100% sure and as a consequence the manipulation score will be zeroed. In the example of a child seat mounted with ISOFIX, as it does not require use of the vehicle seatbelt buckles, the system can be configured to monitor the child seat buckle instead.

In various implementations, the input data is generated based on sets of data points acquired at different time frames over a predetermined time interval and wherein the manipulation score computing step is a function of the manipulation scores of each consecutive set of data points within the sequence. The manipulation score calculation is preferably an average manipulation score or more preferably weighted average manipulation score where the manipulation score of each set of data points within the sequence gets an increasing weight from the oldest set (lower weight) to the most recent set (higher weight).

To further improve the determination of a passenger's intention, it is made use of several consecutive set of data points. In this manner, the manipulation score gets more accurate and does not only reflect an instantaneous situation but rather tracks the passenger's intention during a defined period of time (sequence of consecutive sets) to validate the risk of manipulation.

In various implementations, the method further includes the steps of: assigning from the at least one set of data points, a seat occupancy status (SOS) and/or a child seat presence (CSP) for each passenger's seat; adapting the manipulation score depending on the SOS and/or CSP.

To further improve the determination of a passenger's intention, it is made use of the presence or not of a passenger in a seat and if there is a child seat. For example, if no passenger seats, there is no risk for unbuckling the seatbelt.

In various implementations, the perception-based system includes at least one vision-based system and/or at least one Lidar system, mounted on an overhead area of the vehicle with a field of view covering one or more passenger's seats. The vision-based system is a camera and preferably a wide-angle camera and the Lidar system is preferably an omnidirectional Lidar. The camera and/or Lidar is preferably located between the middle row of seats. More preferably, the perception-based system further includes a second vision-based system and/or second Lidar system located at the rear of the vehicle to get a view of the passenger's seats from the rear of the vehicle.

Although a camera or a Lidar alone gives sufficient information through the retrieved images or point clouds of the inside of the vehicle, combining both systems further increase the reliability of information especially under low light conditions. Adding a second system at the rear side further improves the determination of a passenger's intention, especially in case of a rear facing child seat presence or when the front row of seats at least partially hide the door handles.

According to a second aspect, the present disclosure relates to a non-transitory computer-readable medium including program instructions for causing a processor to execute the method according to any of the embodiments of the first aspect.

According to a third aspect, the present disclosure relates to a perception-based system for implementing the method according to any of the embodiments of the first aspect.

According to a fourth aspect, the present disclosure relates to a vehicle including a perception-based system according to the third aspect.

Other embodiments and advantages will be disclosed hereafter in the detailed description. Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
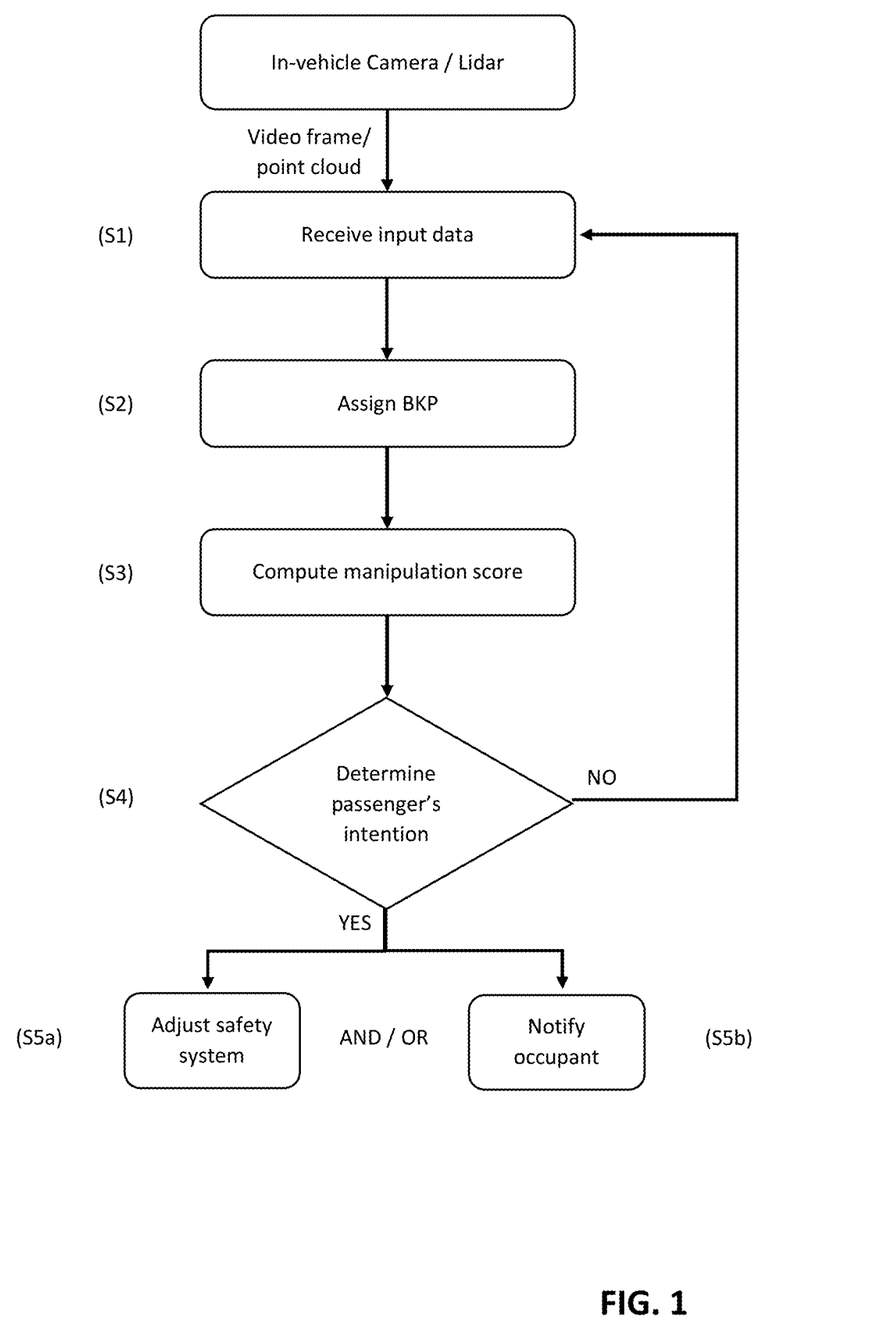
FIG. 1 represents a diagram of a monitoring method according to an embodiment of the present disclosure.

FIG. 1 represents a diagram of a perception-based monitoring method for determining a passenger's intention to unbuckle a seatbelt and/or to open a door. The perception-based method relies on a perception-based system including at least one camera and/or Lidar mounted in the vehicle and providing sets of data points. For sake of simplicity, the following example will mention a camera providing video frames, but it is also possible using a Lidar providing point clouds.

During an initial step (S1), one or several video frames of the interior of the vehicle taken by the camera are received as input data by a processor. The received video frames are processed using a body keypoint detector which assigns (S2) body keypoint positions (BKP) of detected passengers within the video frame(s). Based on the assigned BKPs in relation with a seatbelt buckle position and/or a door handle position, a manipulation score, indicative of an intention of the detected passenger(s) to unbuckle a seatbelt and/or to open a door, is computed (S3). One preferred way to compute the manipulation score is to calculate the distance between the wrist and/or hand positions with a seatbelt buckle or a door handle in the received image; and/or to determine occlusion of a seatbelt buckle or a door handle by the wrist and/or hand positions in the image. Occluded elements can be estimated based on a configuration file including the positions of the buckles and handles as well as the position of the camera.

The manipulation score is compared with a predefined threshold representative of a risk of actual manipulation of the buckle and/or the handle. Through this comparison, the method determines a passenger's intention to unbuckle a seatbelt or open a door (S4). If the manipulation score exceeds the predefined threshold (YES) a passenger's intention is determined and the method adjusts (S5a) at least one control function of a safety system of the vehicle and/or notifies (S5b) at least one occupant, such as the driver or the passenger, of the vehicle of the passenger's intention. If the score does not exceed the predefined threshold (NO), the method returns to the monitoring of received input data (S1).

Figure 2:
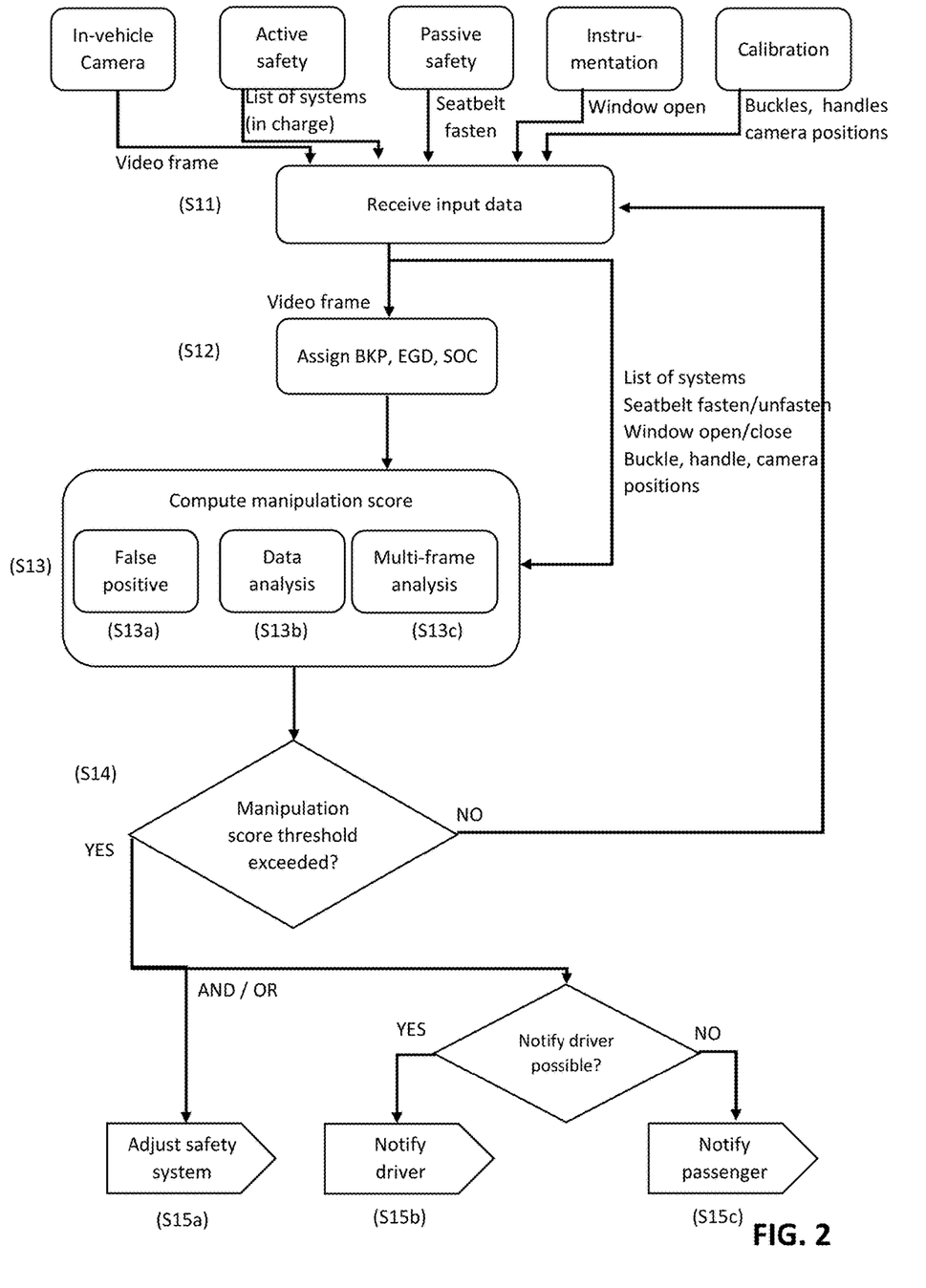
FIG. 2 represents a diagram of a monitoring method according to another embodiment of the present disclosure.

FIG. 2 represents a diagram of a monitoring method according to another embodiment of the present disclosure. As for FIG. 1, a vision-based system, such as a camera mounted in the vehicle, is described although a Lidar could also be used. In this embodiment, the received input data (S11) are coming from several devices installed in the car and includes:

images or video frames with a field of view covering all seats in the vehicle provided by a camera mounted in the vehicle;

a list of currently active safety systems, meaning the ones which are taking some actions; the interface for such a list should allow easy configuration of its content;

a signal from seatbelt detectors indicative of the status of each buckle, buckled/unbuckled;

a signal from the vehicle instrumentation with information on the window status, opened/closed, opening/closing; and positions of the camera, door handles and seat buckles, preferably in the form of a configuration file.

The input data is processed and more specifically the video frame is analyzed using a body keypoint detector and advantageously an eye gaze detector and a child seat detector. The body keypoint detector provides positions of specific body parts, so called body keypoint positions (BKP) such as hand and/or wrist positions. It can optionally also provide positions of other body parts such as eyes, nose, ears, neck, shoulders, elbows, or even give a pose estimation of any passenger seating within the vehicle. The eye gaze detector provides an eye gaze vector or eye gaze direction (EGD), and also optionally head pose (position, rotation), eyelid status (opened/closed). The child seat detector provides a seat occupancy classification (SOC) such as empty, occluded, object, person, child, child seat empty, child seat covered, child seat with child, booster seat empty, booster seat covered, booster seat with child, etc. Based on the received images (video frames), BKP, EGD and SOC are assigned (S12).

Based on the assigned BKPs in relation with a seatbelt buckle position and/or a door handle position, a manipulation score, indicative of an intention of the detected passenger(s) to unbuckle a seatbelt and/or to open a door, is computed (S3). The manipulation score is determined based on the distance between the wrist and/or hand positions with a seatbelt buckle or a door handle in the received image; and/or with the detection of an occlusion of a seatbelt buckle or a door handle by the wrist and/or hand in the image. The positions of the occluded elements is known based on the configuration file including the positions of the buckles and handles as well as the position of the camera. Whenever BKP and EGD are detected, the manipulation score is further computed based on the calculation of the intersection of the EGD with a seatbelt buckle or a door handle in the received image.

In order to prevent false positive notification, several algorithms are processed to detect false positive (S13a) and decrease or even zero the manipulation score. One algorithm detects the level of the passengers' alertness due to sleepiness. In case the passenger is sleeping the manipulation is significantly decreased or even zeroed. Indeed, when a passenger (e.g. a child) is sleeping, their hands can be on the seatbelt buckle but there is a high possibility of no intention to release it. Another algorithm based on the received instrumentation data about opening or closing the window or at least pressing the corresponding window button, as the passenger might open/close the window, the passenger's intention cannot be determined and the manipulation score is therefore decreased. Another algorithm consists in detecting the presence of an ISOFIX child seat and unused corresponding seatbelt buckle. For instance, when a child seat is detected but the corresponding seatbelt is unbuckled, it means the child seat is mounted with ISOFIX. In that case the seatbelt buckle can be excluded from the manipulation detection.

To improve the score manipulation computation, an analysis (S13b) is performed on all input data. Based on BKP (especially hands) and EGD positions, this data analysis using calibration data, determines if a passenger/child keeps a hand on the buckle (or door handle) and/or is looking at it. It is done by calculation of the intersection of eye gaze direction and hand position with buckle/door handle in the 2D or 3D space if the received image(s). Moreover, using body keypoints it is also possible to calculate if a hand is occluding (or is significantly close to) a buckle/door handle which would indicate a high possibility of manipulation, etc.

To improve the score manipulation computation and reduce the false positive notifications, an analysis of several consecutive video frames is performed. Indeed, the analysis of several consecutive frames decreases the possibility of false positives and increase the reliability of the total score. The longer a child/passenger is "playing" with buckle/door handle, the more accurate decision can be taken. For instance, N-previous scores are stored in a buffer and when the buffer is full, an average value from all values is calculated as a total manipulation score. Alternatively, weight coefficients can be applied to each stored values, the weight decreasing over time.

The computed manipulation score is then compared (S14) with a predefined threshold indicative of a passenger's intention to unbuckle a seatbelt or open a door handle and therefore representative of a risk of actual manipulation of the buckle and/or the handle. If the manipulation score exceeds the predefined threshold (YES) a passenger's intention is determined and the method adjusts (S15a) at least one control function of a safety system of the vehicle and/or notifies (S15b) the driver of the vehicle of the passenger's intention if this is possible. If not, it notifies the passenger instead. The decision to notify the driver or the passenger is taken after detecting if predefined situations requiring driver's attention occurs. If such predefined situation is detected, it simply skips or delays the notification to the driver at least until such predefined situation is no longer detected and notifies the passenger instead. If the score does not exceed the predefined threshold (NO), the method returns to the monitoring of received input data (S11).

Below is given an example of a simplified algorithm of score computation written in pseudo code. In this example, it aggregates "False positive detector", "Signal's analysis" and "Statistics analysis" modules described above. The following abbreviations are used: BK—body keypoints, EG—eye gaze, CS—child seat, SB—seatbelt, WND—windows opening, AWK—awakeness. Further, by confidence, it means all "confidence" values provided by specific feature detectors. For example, EG_confidence is provided by Eye gaze detector. By weight, it means all weights which shall be adjusted depending on different configuration (camera, camera position, car, etc.) and preferably stored in configuration files (calibration) to allow easy replacement.

Figure 3:
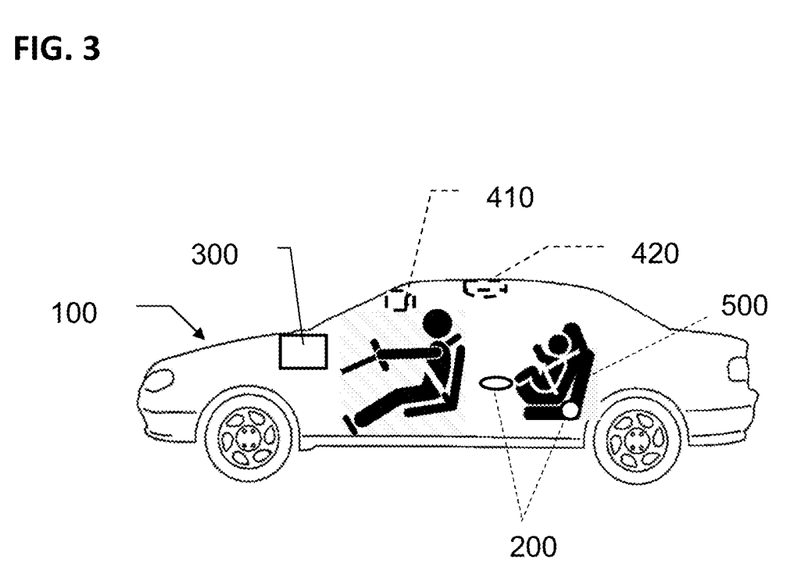
FIG. 3 represents a vehicle equipped with a perception-based system according to the present disclosure.

FIG. 3 represents a vehicle 100 equipped with a perception-based system 410, 420 according to one embodiment the present disclosure. The perception-based system includes a camera 410 and or a Lidar 420 mounted in the vehicle and preferably mounted on an overhead area of the vehicle with a field of view covering one or more passenger's seats 500. The vehicle also includes a processor 300 configured to execute the monitoring method for determining a passenger's intention to unbuckle a seatbelt and/or to open a door by manipulating the buckle and/or door handle 200, as presented in any of the above embodiments The present disclosure also relates to a non-transitory computer-readable medium including program instructions for causing the processor 300 to execute the method according to any of its embodiments or according to any possible combination of its embodiments. The term "non-transitory" does not exclude legitimate tangible temporary storage media such as flash drives or any rewritable storage media. Generally speaking, a computer-accessible medium may include any tangible or non-transitory storage media or memory media such as electronic, magnetic, or optical media. Such a media may be a disk, a CD/DVD-ROM or any other medium. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM) and flash memory. Program instructions and data stored on a tangible computer-accessible storage medium in non-transitory form may further be transmitted by transmission media or signals such as electrical, electromagnetic or digital signals.

Although an overview of the disclosed subject matter has been described with reference to specific example embodiments, various modifications and changes may be made to these embodiments without departing from the broader spirit and scope of the claimed embodiments.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A perception-based monitoring method comprising:
receiving input data including a set of data points of an interior of a vehicle captured by a perception-based system mounted in the vehicle;
assigning, based on the set of data points, a set of predefined body keypoint positions (BKP) associated with a passenger, including wrist positions of the passenger and hand positions of the passenger, detected by the perception-based system;
computing a manipulation score indicative of an intention of the passenger to disengage a vehicle restraint based on the assigned set of predefined BKP in relation to the vehicle restraint, wherein the computing includes:
calculating a distance in 2D space of the set of data points between the vehicle restraint and at least one of the wrist positions or the hand positions; and
determining occlusion of the vehicle restraint, by at least one of the wrist positions or the hand positions, in 2D space of the set of data points;
in response to the manipulation score exceeding a predefined threshold, determining that the passenger possesses the intention to disengage the vehicle restraint; and
in response to determining that the passenger possesses the intention to disengage the vehicle restraint, at least one of:
adjusting at least one control function of a safety system of the vehicle; and
notifying at least one occupant of the vehicle of the intention to disengage the vehicle restraint.

2. The method of claim 1 wherein the vehicle restraint includes at least one of a seatbelt and a door.

3. The method of claim 2 wherein:
disengaging the seatbelt involves unbuckling a buckle of the seatbelt; and
disengaging the door involves opening the door using a handle of the door.

4. The method of claim 1 wherein:
the vehicle restraint includes a seatbelt and a door;
disengaging the seatbelt involves unbuckling a buckle of the seatbelt; and
disengaging the door involves opening the door using a handle of the door.

5. The method of claim 1 wherein:
the method includes, in response to determining that the passenger possesses the intention to disengage the vehicle restraint, notifying the at least one occupant of the vehicle; and
the notifying includes:
detecting existence of a set of predefined situations that require attention of a driver of the vehicle;
in response to detecting that at least one of the set of predefined situations exists:
preventing notification to the driver until existence of the at least one of the set of predefined situations is no longer detected, and
notifying the passenger; and
in response to detecting that none of the set of predefined situations exists, notifying the driver.

6. The method of claim 1 wherein:
the assigning includes determining, from the set of data points, an eye gaze direction (EGD) of the passenger; and
the computing includes calculating an intersection of the EGD with the vehicle restraint in the set of data points.

7. The method of claim 6 wherein:
the assigned set of predefined BKP and determined EGD are each given with a confidence value based on detection correctness factor associated with the perception-based system; and
the computing is weighted by the confidence values.

8. The method of claim 1 wherein the input data includes at least one of:
status data of the safety system in operation to determine situations requiring driver's attention;
status data of the vehicle restraint of the passenger to prevent false positive notification;
vehicle instrumentation data of a window of the vehicle corresponding to the passenger, wherein the vehicle instrumentation data indicates whether the window is opening or closing to prevent false positive notification; and
calibration data on relative positions within the vehicle between the perception-based system and the vehicle restraint as parameters for computing the manipulation score.

9. The method of claim 1 further comprising:
identifying false positives of the intention to disengage the vehicle restraint;
assigning a confidence coefficient to the identified false positives; and
amending the manipulation score based on the identified false positives weighted with the confidence coefficient.

10. The method of claim 1 wherein:
the input data is generated based on a plurality of sets of data points acquired at different time frames over a predetermined time interval; and
the computing includes computing a respective manipulation score for each of the plurality of sets of data points.

11. The method of claim 1 further comprising:
assigning, from the set of data points, a seat occupancy status (SOS) for each passenger seat; and
adapting the manipulation score based on the SOS.

12. The method of claim 1 further comprising:
assigning, from the set of data points, a child seat presence (CSP) for each passenger seat; and
adapting the manipulation score based on the CSP.

13. The method of claim 1 wherein the perception-based system includes at least one of:
a vision-based system mounted in an overhead area of the vehicle with a field of view covering one or more passenger seats; and
a Lidar system mounted in the overhead area with the field of view covering one or more passenger seats.

14. The method of claim 13 wherein the perception-based system includes at least one of:
a second vision-based system located at a rear of the vehicle with a field of view of the one or more passenger seats from the rear of the vehicle; and
a second Lidar system located at the rear of the vehicle with a field of view of the one or more passenger seats from the rear of the vehicle.

15. A non-transitory computer-readable medium comprising program instructions including:
receiving input data including a set of data points of an interior of a vehicle captured by a perception-based system mounted in the vehicle;
assigning, based on the set of data points, a set of predefined body keypoint positions (BKP) associated with a passenger, including wrist positions of the passenger and hand positions of the passenger, detected by the perception-based system;

computing a manipulation score indicative of an intention of the passenger to disengage a vehicle restraint based on the assigned set of predefined BKP in relation to the vehicle restraint, wherein the computing includes:
calculating a distance in 2D space of the set of data points between the vehicle restraint and at least one of the wrist positions or the hand positions; and
determining occlusion of the vehicle restraint by at least one of the wrist positions or the hand positions in 2D space of the set of data points;

in response to the manipulation score exceeding a predefined threshold, determining that the passenger possesses the intention to disengage the vehicle restraint; and in response to determining that the passenger possesses the intention to disengage the vehicle restraint, at least one of:
adjusting at least one control function of a safety system of the vehicle; and
notifying at least one occupant of the vehicle of the intention to disengage the vehicle restraint.

16. A perception-based system comprising a set of processors configured to execute instructions from memory, wherein the instructions include:
receiving input data including a set of data points of an interior of a vehicle captured by a perception-based system mounted in the vehicle;
assigning, based on the set of data points, a set of predefined body keypoint positions (BKP) associated with a passenger, including wrist positions of the passenger and hand positions of the passenger, detected by the perception-based system;
computing a manipulation score indicative of an intention of the passenger to disengage a vehicle restraint based on the assigned set of predefined BKP in relation to the vehicle restraint, wherein the computing includes:
calculating a distance in 2D space of the set of data points between the vehicle restraint and at least one of the wrist positions or the hand positions; and
determining occlusion of the vehicle restraint by at least one of the wrist positions or the hand positions in 2D space of the set of data points;
in response to the manipulation score exceeding a predefined threshold, determining that the passenger possesses the intention to disengage the vehicle restraint; and in response to determining that the passenger possesses the intention to disengage the vehicle restraint, at least one of:
adjusting at least one control function of a safety system of the vehicle; and
notifying at least one occupant of the vehicle of the intention to disengage the vehicle restraint.

17. A vehicle comprising the perception-based system according to claim 16.

18. A perception-based monitoring method comprising:
receiving input data including a set of data points of an interior of a vehicle captured by a perception-based system mounted in the vehicle;
assigning, based on the set of data points, a set of predefined body keypoint positions (BKP) associated with a passenger detected by the perception-based system;
computing a manipulation score indicative of an intention of the passenger to disengage a vehicle restraint based on the assigned set of predefined BKP in relation to the vehicle restraint;
in response to the manipulation score exceeding a predefined threshold, determining that the passenger possesses the intention to disengage the vehicle restraint; and
in response to determining that the passenger possesses the intention to disengage the vehicle restraint, at least one of:
adjusting at least one control function of a safety system of the vehicle; and
notifying at least one occupant of the vehicle of the intention to disengage the vehicle restraint,
wherein the input data includes at least one of:
status data of the safety system in operation to determine situations requiring driver's attention,
status data of the vehicle restraint of the passenger to prevent false positive notification,
vehicle instrumentation data of a window of the vehicle corresponding to the passenger, wherein the vehicle instrumentation data indicates whether the window is opening or closing to prevent false positive notification; and
calibration data on relative positions within the vehicle between the perception-based system and the vehicle restraint as parameters for computing the manipulation score.

* * * * *